Patented June 7, 1938

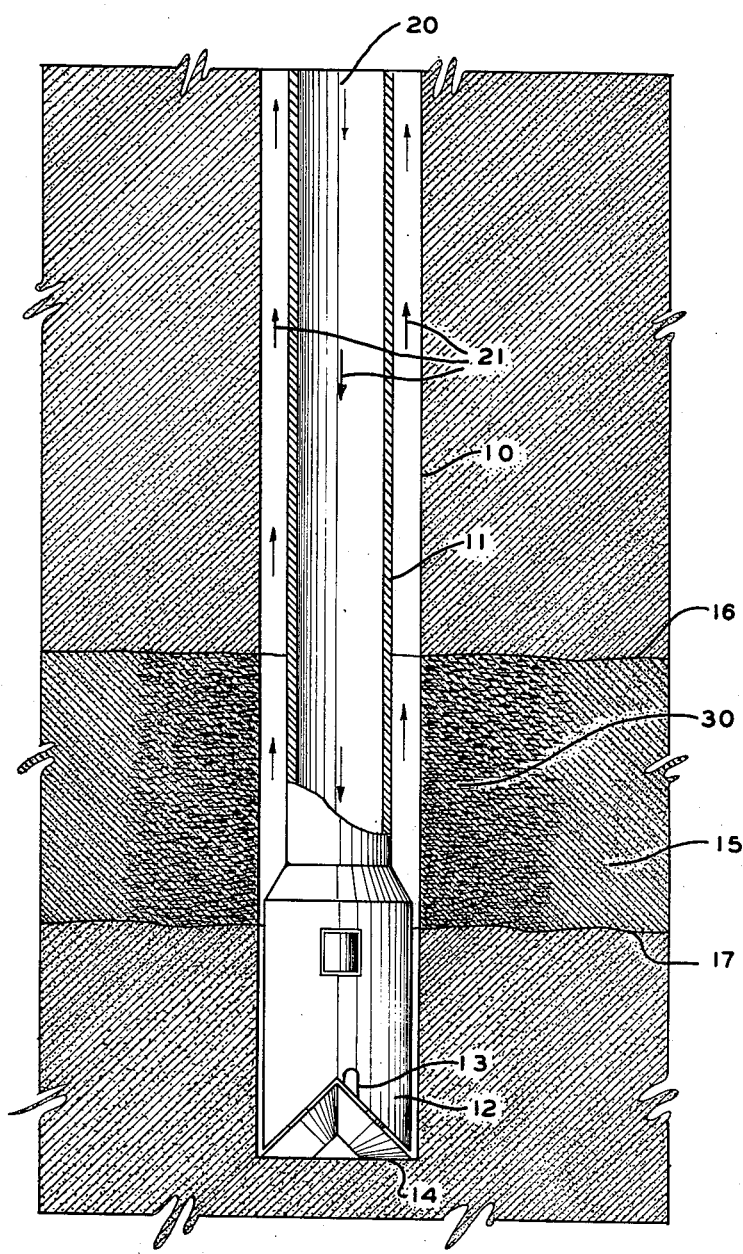

2,119,829

UNITED STATES PATENT OFFICE 2,119,829

METHOD OF AND COMPOSITION FOR PREVENTING THE LOSS OF DRILLING FLUID IN WELL DRILLING OPERATIONS

Claude P. Parsons, Duncan, Okla., assignor to Phillips Petroleum Company, Bartlesville, Okla., a corporation of Delaware Application May 12, 1936, Serial No. 79,365

7 Claims. (Cl. 255—1)

This invention relates to well drilling and in particular to a method of and composition for preventing the partial or complete loss of circulation during rotary drilling operations or the loss of drilling mud when drilling with cable tools.

In drilling operations, as will be understood by those skilled in the art, a substance which may comprise a mixture of water and solid material such as clay forming a drilling mud is employed. In addition certain gelatinous materials or gel forming chemicals and/or colloids are sometimes added to the mud.

When drilling wells by the rotary drilling method, muds are utilized to soften the formation, to lubricate the bit and to remove the cuttings. The last named function is important because without the continuous removal of the cuttings a continuous drilling operation would be impossible.

In order that the cuttings may be removed by the mud it is necessary to maintain a constant circulation of the drilling fluid from the surface to the drilling point and back to the surface. This is accomplished by forcing the mud, under pressure, down through the drill pipe and out through the bit, lubricating it and softening the formation in its passage, and then up around the drill pipe to the surface along with the cuttings which the fluid collects and carries with it.

It will be apparent that any condition which results in loss of circulation in the aforedescribed operation, will eventually force a cessation of the drilling unless promptly remedied because the bit will "freeze" in the hole due to lack of lubrication and the accumulation of drilled material. Furthermore, the circulating fluid serves to bolster or brace the sides of the well hole during the drilling operation and hence loss of circulation may result in collapse of the walls.

Complete or gradual loss of circulation is not unusual in drilling operations and is attributed to loss of drilling fluid into porous formations in the wall of the hole due to the character of the formation encountered at any particular depth, and in the event this loss of circulation results in the penetration of an oil producing formation by the drilling fluid, said formation may become partially or permanently sealed. It is known that many wells of good production have been seriously damaged and in many instances ruined beyond reclamation by mud, lost into the sand from an offset well, entering the well that is producing. In fact, low pressure sands are invariably damaged beyond reclaiming, because of migration of drilling mud into the porous formations. Many sands that would have been productive are entirely sealed off and production lost.

Heavy colloidal muds have been used to protect a producing formation, but the protection against mud entering the pores of the formation has been only partial. Furthermore, close heavy muds have other serious disadvantages. Excessive pump pressures are necessary to circulate the mud and the cuttings suspended in the mud fail to drop out when circulated to the surface.

Graveled deposits, sand, loose shale, crevices in rock strata and cavities all provide porous formations into which the drilling fluid may flow thus interrupting circulation and usually forcing a shut-down unless circulation can be re-established.

In the past, various attempts have been made to seal off these porous formations either by thickening the drilling mud itself, or by the addition of some foreign material thereto to seal the formations and thereby regain lost circulation. The only widely used foreign material added to the mud in drilling wells for this purpose has been cotton seed hulls. In fact the addition of cotton seed hulls has become practically standard practice for this purpose. This material was used because it was available in natural form and had some sealing or wadding characteristics.

In many instances, the effectiveness of this sealing agent has been unsatisfactory. Repeatedly, during the reduction to practice of the invention, described herein, successful results have been obtained in wells after other materials had failed and the drilling operators had exhausted all known means in vain attempts to regain circulation. When it is recalled that circulating fluids used in present day drilling practice usually contain quantities of expensive commercial admixtures and chemicals designed for controlling the weight, viscosity and other physical characteristics of the circulating fluid, it can be appreciated that the expense involved is enormous and the use of inefficient sealing materials, to seal formations against loss of the circulating fluid into the formation, is not in keeping with good practice nor proper economy. Furthermore, it has been found by laboratory tests that cotton seed hulls form a thick seal on the surface of a formation and have very little, and in most cases no, penetration into the formation, with the result that each time the bit is pulled, or run, or when the casing is cemented, the seal is knocked off, the formation is again exposed and loss of circulating fluid begins again, or loss of cement slurry occurs during a subsequent cementing operation in the well.

A further deleterious feature of cotton seed hulls resides in the difficulty encountered in keeping them in proper suspension in the drilling fluid. This material was not used as a matter of selection as to their efficiency or size in relation to the conditions in the wells, but merely because it was available to the location of the drilling wells in which the problem was encountered. Cotton seed hulls when added to circulating fluid immediately endanger clogging of the drill pipe, bit and pumps, and disintegrate rapidly in the fluid vehicle due to absorption of liquid therefrom. Furthermore, this material when added to the circulating fluid eventually disintegrates and breaks down into a soupy mass thus ruining the expensive circulating fluid. Therefore, in the normal development of modern drilling practice, the disadvantages of materials previously used have become sufficiently important that steps had to be taken to provide a sealing material which would measure up to the efficiency of other phases of modern drilling practice. The development of such a material which would not only overcome the objectionable features of materials previously used, and at the same time would be economical, was the purpose of my invention.

Loss of drilling fluid into the formation results in a great expense not only due to the inherent value of the material itself but also in the time lost as a result of suspension of drilling operations and perhaps loss of the well. In some instances great quantities of fluid laden with sealing materials have been placed in wells over a period of days in vain attempts to regain lost circulation.

While circulation is not a factor in drilling with cable tools, nevertheless it is necessary to maintain a supply of mud at the drilling point for softening the formation and lubricating the tools. Therefore, any substantial loss of mud into the formation creates a serious problem.

An object of applicant's invention is to prevent the loss of drilling fluid in well drilling operations.

Another object of applicant's invention is to prevent the loss of circulating fluid in rotary drilling operations.

A further and more specific object of applicant's invention is to seal off porous formations encountered during the drilling operations.

A still further object of the present invention is to reduce the gradual penetration of fluid into the formation which accompanies the best of seals.

Additional objects of applicant's invention are to provide a seal at porous formations which will provide a seal beneath the surface of the formation as well as at the surface thereof; and to provide a material for sealing the porous formations which will not interfere with the circulation of the drilling fluid, will not deteriorate substantially during drilling operations, and will not readily separate out of the drilling fluid.

Other objects and advantages of applicant's invention will be apparent from the following description and attached drawing forming a part thereof, wherein:

Figure 1 illustrates a vertical cross-sectional view of a well hole being drilled by a rotary tool.

In Figure 1 there is illustrated a well hole 10 which has been drilled by a rotary tool shown at 12. A hollow drill pipe 11 is connected to the drill 12 and serves both as a torque transmitter to the tool and as a conveyor for circulating fluid to the formation. As the tool is rotated from the well surface, circulating fluid as previously described is forced down through the drill pipe 11 into the tool 12, out through the orifices 13 where it lubricates the tool and picks up cuttings which it carries to the surface through the annular space between the drill pipe and well hole 10. The usual circulation of fluid is indicated by the arrows 21.

Frequently porous formations indicated at 15 are encountered during the course of drilling into which the circulation fluid flows instead of returning to the well as in normal operation. These formations may be of a nature previously set forth but in all cases interstices of various sizes open into the well hole according to the character of the formation, which provide channels for the conveyance of fluid into the formation and consequent loss of circulation resulting in accumulation of cuttings and subsequent freezing of the tool.

Applicant has discovered that the addition of certain materials in a particular form to the circulating fluid will efficiently seal these porous formations and will either prevent substantial loss of circulating fluid or restore lost circulation in a much shorter time and with less loss of fluid than previously, and in many instances will restore circulation in wells in which all other known means have failed.

Applicant has discovered that it is necessary in a satisfactory sealing agent for addition to the circulating fluid, that a proper amount of material in a fibrous, as distinguished from an amorphous form, be present. In addition, it is highly desirable that the fibres be non-disintegrating and be graded in length, and be selected from fibre lengths up to approximately one or one and one quarter inches. Applicant has further found that in some conditions there should be intermixed or distributed through this fibrous material a certain amount, roughly 10 to 50 per cent, of a matting material composed substantially of very fine, short fibres.

It has been found by applicant and proved by tests that particularly in large porous formations where the formation particles are in the neighborhood of an inch in diameter, or the voids in a rock such as limestone are equivalent in size to the spaces between such particles, or in formations where they are graded from small to large, that fibres of the greater length previously stated, penetrate the formation to a certain extent and form a mesh or bridge-work therein as a base or foundation for the accumulation of smaller fibres. The latter material builds up on the larger fibrous mesh or bridge-work and fills the interstices therein, thus providing an efficient seal against further filtration of circulating fluid.

It has also been found that it is desirable that a major portion of the fibres be non-absorbent thereby to retain their true fibrous configuration and structure thus resisting disintegration and retaining their efficacy over a long period of time.

In previous substances used as an addition to circulating fluid and known to applicant, the fibrous structure was entirely lacking or the fibres were not of such character and distribution as to be effective to anywhere near the extent of applicants.

In the aforementioned tests conducted under applicant's direction, it was found that with the material most widely used in previous attempts to regain lost circulation, namely cotton seed hulls, very little if any seal was built up beneath the surface of the porous formation, but that this material if at all effective produced a seal at the surface of the formation only and, moreover, that the seal continued to build up to such an extent that there was a considerable extension of the sealing material into the well hole. It will be readily apparent that such a condition is very unsatisfactory because when any object such as the drill bit is moved up or down in the hole the seal will be knocked off, or the seal will slough off due to flow of circulation, and because of the fact that it is a surface seal, it is destroyed and circulation lost.

In using applicant's composition, however, the fibrous material penetrates the formation and builds up a seal very quickly just beneath the surface of the formation while very little is built up on the surface, as was clearly demonstrated by the tests conducted. It was further found when using applicant's material that if that portion of the seal, which in some instances extended into the hole, was knocked off, not only was the effectiveness of the seal undisturbed but also no further external deposit at and above the surface occurred. This last observation is readily explained because the seal within the formation prevented further filtration of the drilling fluid thereinto and hence no additional sealing material would be deposited at that point.

Applicant's fibrous sealing material may be manufactured from sugar cane, bagasse, bamboo, corn stalks, etc. The matty material, when mixed with the selected fibres, may be any fine fibrous material, or such material as paper pulp, macerated paper, etc. Other sources from which the sealing material may be manufactured will readily occur to those skilled in the art.

It is to be understood that the particular material used to produce the fibres is not the essence of applicant's contribution, but rather the proper type, proportioning, and grading of the fibres and/or matting materials, if used.

Applicant has found that a two percent mixture of his sealing material in the drilling fluid makes the most effective combination as a rule, although proportions somewhat above and below that mentioned are effective and may sometimes be desirable. Applicant has also found that the fibres should be graded within the range previously mentioned; and that in some cases matting material should be added to the material to fill in the small interstices formed by the fibres when making the seal.

It should be understood that while the above proportions were found by actual tests to produce the best results on the test formations, particularly those of large porosity, nevertheless acceptable results can be obtained by varying both the proportional parts and the range of fibre lengths. Also, it is not essential in some instances that a matty material be used if there is present a sufficient percentage of very short fibres.

Having thus described my invention, I claim:

1. In the drilling of well holes, the method of preventing loss of drilling fluid into openings in the well wall which consists in incorporating in the drilling fluid sugar cane fibers that have been substantially desugared, and of graded lengths within the range up to one inch, pumping the resulting composition into the well hole and to the openings in the formation to form a seal therein against the loss of fluid therethrough.

2. In a composition of matter for sealing openings in a well hole wall, the combination of a fluid to act as a carrying vehicle and sugar cane fibers of graded lengths that have been substantially desugared.

3. In a sealing composition for sealing openings in a well hole wall, the combination of a fluid to act as a carrying vehicle and a sealing substance comprising a mixture of fibers of graded lengths and a matting material of paper pulp.

4. In a composition for sealing openings in well hole walls to prevent the loss of drilling fluid therethrough, the combination of a drilling fluid and a sealing agent comprising a mixture of non-absorptive fibers of graded lengths and a matting substance consisting of ground paper.

5. In a composition for sealing openings in well hole walls to prevent the loss of drilling fluid therethrough, the combination of a drilling fluid and a sealing agent comprising a mixture of sugar cane fibers of graded lengths and a matting substance consisting of ground paper.

6. In the drilling of well holes the method of preventing loss of drilling fluid into openings in the well wall which consists in incorporating in the drilling fluid sugar cane fibers of graded lengths within the range up to one inch and a matting substance consisting of ground paper, pumping the resulting composition into the well hole and to the openings in the formation to form a seal therein against the loss of fluid therethrough.

7. In the drilling of well holes, the method of preventing loss of drilling fluid into openings in the well wall which consists in incorporating in the drilling fluid sugar cane fibers that have been substantially desugared, and of graded lengths within the range up to one inch and a matting substance consisting of ground paper, pumping the resulting composition into the well hole and to the openings in the formation to form a seal therein against the loss of fluid therethrough.

CLAUDE P. PARSONS.